(12) United States Patent  
Lin

(10) Patent No.: US 7,949,199 B2  
(45) Date of Patent: May 24, 2011

(54) IMAGE PROCESSING METHOD AND RELATED APPARATUS FOR AN IMAGE PROCESSING SYSTEM

(75) Inventor: Teng-Yi Lin, Kaohsiung County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 1000 days.

(21) Appl. No.: 11/769,704

(22) Filed: Jun. 27, 2007

(65) Prior Publication Data

US 2008/0285882 A1    Nov. 20, 2008

(30) Foreign Application Priority Data

May 14, 2007    (TW) ................................ 96117096 A

(51) Int. Cl.
 *G06K 9/40* (2006.01)
 *H04N 1/46* (2006.01)
(52) U.S. Cl. .......................... 382/263; 382/266; 358/532

(58) Field of Classification Search .......... 382/260–269, 382/305, 312; 348/581, 625, 630, 631; 358/1.2, 358/532
See application file for complete search history.

(56) References Cited

U.S. PATENT DOCUMENTS

| 5,848,196 A | * | 12/1998 | Sharman | 382/260 |
| 7,483,081 B2 | * | 1/2009 | Wu | 348/625 |
| 7,782,401 B1 | * | 8/2010 | Chou | 348/581 |
| 2005/0012866 A1 | | 1/2005 | Chiang | |

* cited by examiner

*Primary Examiner* — Kanji Patel
(74) *Attorney, Agent, or Firm* — Winston Hsu; Scott Margo

(57) ABSTRACT

An image processing method for an image processing system for enhancing image quality after a sharpening procedure includes receiving a plurality of original image data, performing the sharpening procedure for the plurality of original image data for generating a plurality of sharpened image data, adjusting the plurality of sharpened image data according to the plurality of original image data, and outputting the plurality of sharpened image data.

12 Claims, 4 Drawing Sheets

IMAGE PROCESSING METHOD AND RELATED APPARATUS FOR AN IMAGE PROCESSING SYSTEM

BACKGROUND OF THE INVENTION

1. Field of the Invention

The present invention is related to an image processing method and related apparatus for an image processing system, and more particularly, to an image processing method and related apparatus capable of effectively suppressing overshooting and background noise.

2. Description of the Prior Art

In a prior art image processing system, an image-processing unit may perform image operations for digital image signals, such as scanning-type transition, scaling, edge detection and compensation, color space transformation, etc. Some of the operations need low-pass filtering operations, which may decrease image sharpness. For example, an NTSC television broadcast display system, said NTSC system hereinafter, displays images by interlacing scanning. The interlacing scanning is initially utilized for CRT devices, which scans a display panel twice for each picture by dividing each picture into two fields. One field is composed of odd scan lines, and the other field is composed of even scan lines. To change from interlacing to line-by-line scanning, a low-pass filter is used, so that image sharpness is decreased. In addition, an image scaling operation may also reduce image sharpness. The image scaling operation magnifies or reduces image size to conform a specified format. For example, a 4:3 NTSC image must undergo horizontal and vertical scaling procedures to be displayed on a 16:9 display device. That is, signals received by a TV must be performed the scaling operation to conform to the specified display format, and thus low-pass and interleaving operations are needed. As a result, image sharpness is decreased.

In general, image-processing procedures having the low-pass and interleaving operations inevitably lose image details. Therefore, the prior art usually adds sharpness control steps during the image processing procedures. A common way is to use a peaking process for sharpening image edges, so as to enhance the quality of the image edges. However, the prior art peaking processing may cause overshooting of image edges and decrease image quality accordingly.

Please refer to FIG. 1. FIG. 1 is a block diagram of a prior art sharpness control unit 10. The sharpness control unit 10 includes a high-pass filter 100, a coring operation unit 102, a multiplier 104, and an adder 106. The high-pass filter 100 performs high-pass filtering operations for input image signals. Then, the coring operation unit 102 performs nonlinear coring operations for the filtered image signals with an input-to-output relation as shown in FIG. 2. As shown in FIG. 2, data adjacent a noise level (represented by the threshold Th) can be used for eliminating noise and decreasing values below the threshold Th to zero. The multiplier 104 multiplies the operation results of the coring operation unit 102 by an SF (Scaling Factor, or named a gain) for adjusting and combines signal values with the original image.

In the sharpness-control unit 10, high-frequency data pass through the high-pass filter 100, so that the sharpness procedure enhances high-frequency image edges, meaning that only dots and diagonal lines can be enhanced. In other words, using the sharpness-control unit 10, the sharpness of Hard Edges, obvious and clear edges with high contrast or severe brightness variation, can be dramatically increased, while the sharpness of Soft Edges, unobvious and blur edges with tiny brightness variation, is only slightly enhanced. The sharpness-control unit 10 uses the multiplier 104 to adjust the gain of the image signals. A ratio of Soft edges to the high-pass-filtered image signals provided by the high-pass filter 100 is small, so that even if the gain is increased, the sharpness of Soft Edges can be slightly enhanced. Oppositely, a ratio of Hard Edges to the high-pass-filtered image signals provided by the high-pass filter 100 is high, so that even if the gain is not high, the sharpness of Hard Edges can be effectively enhanced. However, such situation is not the ideal case, because Hard Edges are originally defined as clear edges in the images, and Soft Edges are supposed to be enhanced. Nevertheless, if the scaling factor SF is increased to a value capable of enhancing Soft Edges, Hard Edges will be overshot and background noise will be amplified. Therefore, to prevent overshooting of Hard Edges, the prior art sharpness control unit 10 provides limited sharpness enhancement for Soft Edges.

SUMMARY OF THE INVENTION

It is therefore a primary objective of the claimed invention to provide an image processing method and related apparatus for an image processing system.

The present invention discloses an image processing method of an image processing system for enhancing image quality after a sharpening procedure, which comprises receiving the plurality of the original image data, performing the sharpening procedure for the plurality of original image data for generating a plurality of sharpened image data, adjusting the plurality of the sharpened image data according to the plurality of the original image data, and outputting the plurality of the sharpened image data.

The present invention further discloses an image processing apparatus of an image processing system for enhancing image quality after a sharpening procedure, which comprises a reception end for receiving the plurality of the original image data, a sharpness control unit coupled to the reception end for performing the sharpening procedure for the plurality of the original image data for generating a plurality of the sharpened image data, a sharpness compensation unit coupled to the reception end and the sharpness control unit for adjusting the plurality of sharpened image data according to the plurality of the original image data, and an output end coupled to the sharpness compensation unit for outputting the plurality of the sharpened image data.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
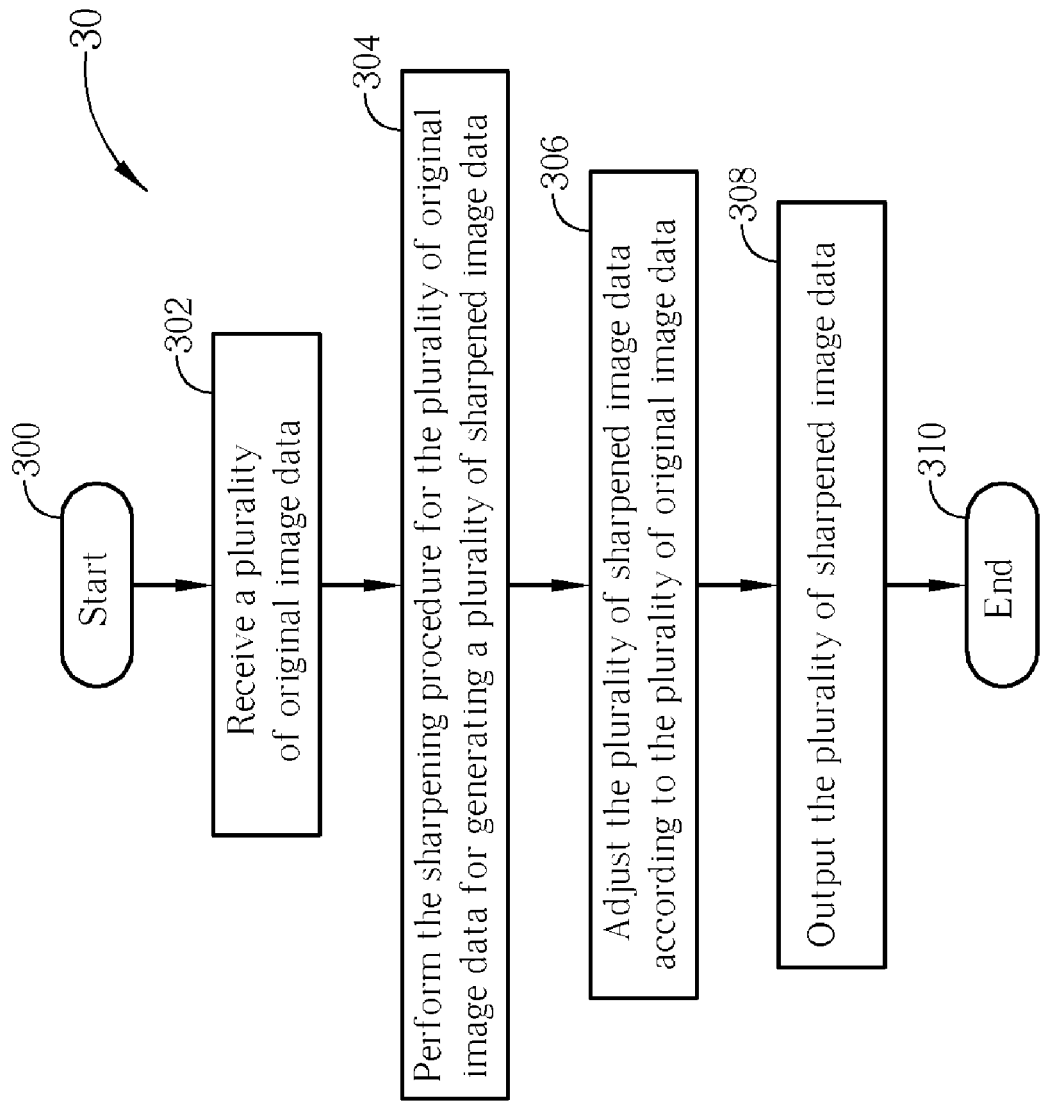
FIG. 3 illustrates a schematic diagram of an image processing process according to an embodiment of the present invention.

Please refer to FIG. 3. FIG. 3 illustrates a schematic diagram of an image processing process 30 for an image processing system according to an embodiment of the present invention. The image processing process 30 can enhance image quality after a sharpening procedure. The image processing process 30 comprises:

Step 300: Start.

Step 302: Receive a plurality of original image data.

Step 304: Perform the sharpening procedure for the plurality of original image data for generating a plurality of sharpened image data.

Step 306: Adjust the plurality of sharpened image data according to the plurality of original image data.

Step 308: Output the plurality of sharpened image data.

Step 310: End.

According to the image processing process 30, the present invention adjusts the sharpened image data based on values of the original image data after the sharpening procedure. In others words, after the sharpening procedure performed for the original image data, the present invention adjusts the sharpened image data according to the original image data, so as to avoid overshooting and suppress background noise.

In the image processing process 30, the step 304 is performing the sharpening procedure for the original image data, which can be any sharpening procedure process. For example, the step 304 can be realized by performing a high-pass filtering operation and a coring operation in advance, multiplying the coring results by a gain, and accumulating the multiplied results with the original image data for generating the sharpened image data. Preferably, the step 306 is adjusting the sharpened image data according to the maximum and minimum values of the original image data. For example, if a value of a sharpened image data is greater than the maximum value of the plurality of original image data, the value of the sharpened image data can be set to be the maximum value or be divided by a predefined value, so as to decrease the value of the sharpened image data. Oppositely, if a value of a sharpened image data is smaller than the minimum value of the plurality of original image data, the value of the sharpened image data can be set to be the minimum value of the plurality of original image data or be multiplied by a predefined value, so as to magnify the value of the sharpened image data. Therefore, the problems of overshooting and magnification of background noise can be avoided.

In the prior art, image quality will be deteriorated due to overshooting of Hard Edges and magnification of background noise after the scaling factor is increased to enhance Soft edges. In comparison, the present invention adjusts the sharpened data according to the extremum of the original image data. Therefore, when enhancing image intensity of Soft Edges, the present invention can suppress overshooting of Hard Edges and avoid background noise being magnified.

Figure 4:
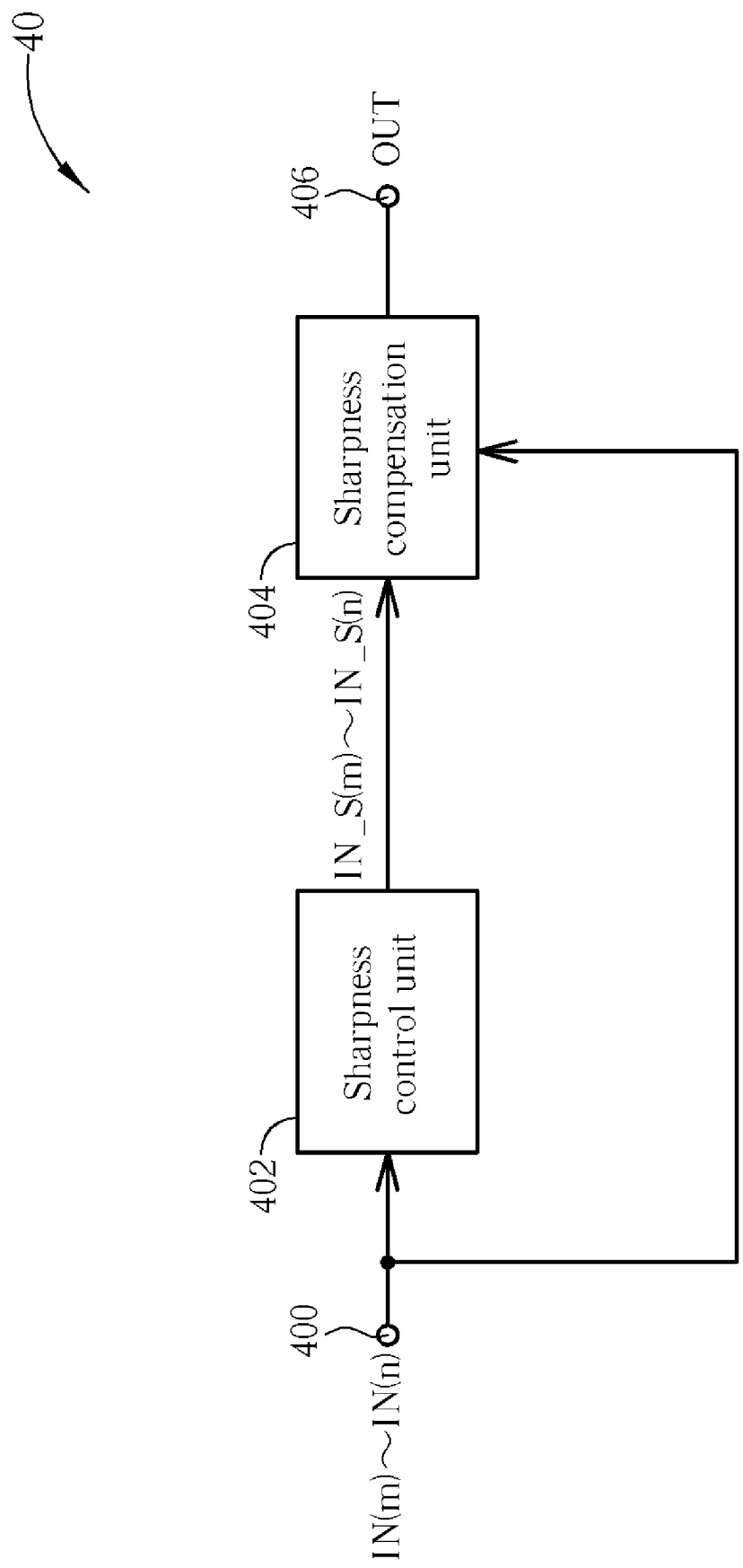
FIG. 4 illustrates a schematic diagram of an image processing apparatus according to an embodiment of the present invention.

As to hardware implementation of the image processing process 30, please refer to FIG. 4. FIG. 4 illustrates a schematic diagram of an image processing apparatus 40 of an image processing system according to an embodiment of the present invention. The image processing apparatus 40 can enhance image quality after a sharpening procedure, and comprises a reception end 400, a sharpness-control unit 402, a sharpness compensation unit 404, and an output end 406. In the image processing apparatus 40, the sharpness-control unit 402 performs the sharpening procedure for original image data IN (m)~IN (n) received by the reception end 400, and generating sharpened image data IN_S (m)~IN_S (n) accordingly. The sharpness compensation unit 404 adjusts the sharpened image data IN_S (m)~IN_S (n) according to the original image data IN (m)~IN (n), and outputs adjusted results OUT through the output end 406. Therefore, after the sharpness-control unit 402 performs the sharpening procedure for the original image data IN (m)~IN (n), the sharpness compensation unit 404 can adjust the sharpened image data IN_S (m)~IN_S (n) according to the original image data IN (m)~IN (n), so as to avoid overshooting and prevent background noise being magnified.

Figure 1:
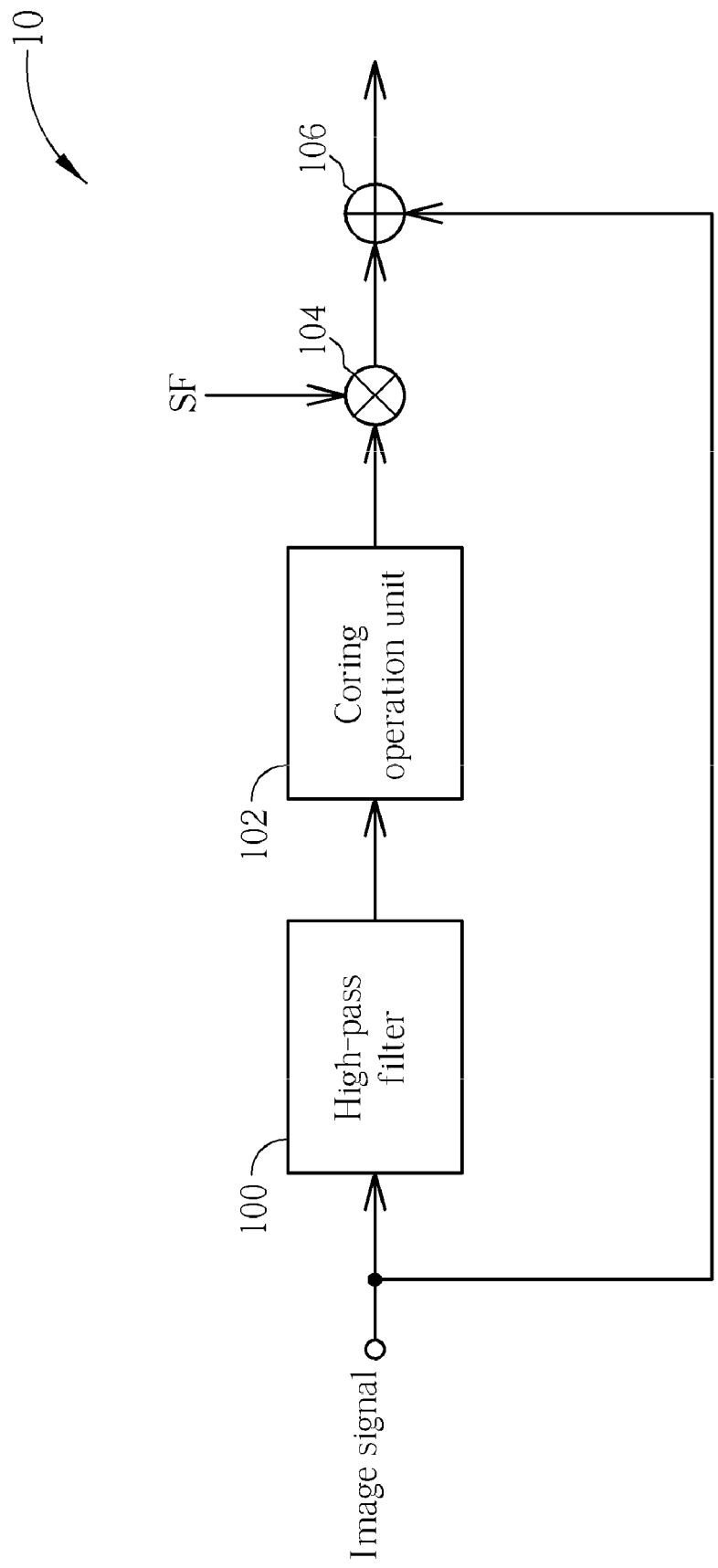
FIG. 1 illustrates a block diagram of a prior art sharpness-control unit.
Figure 2:
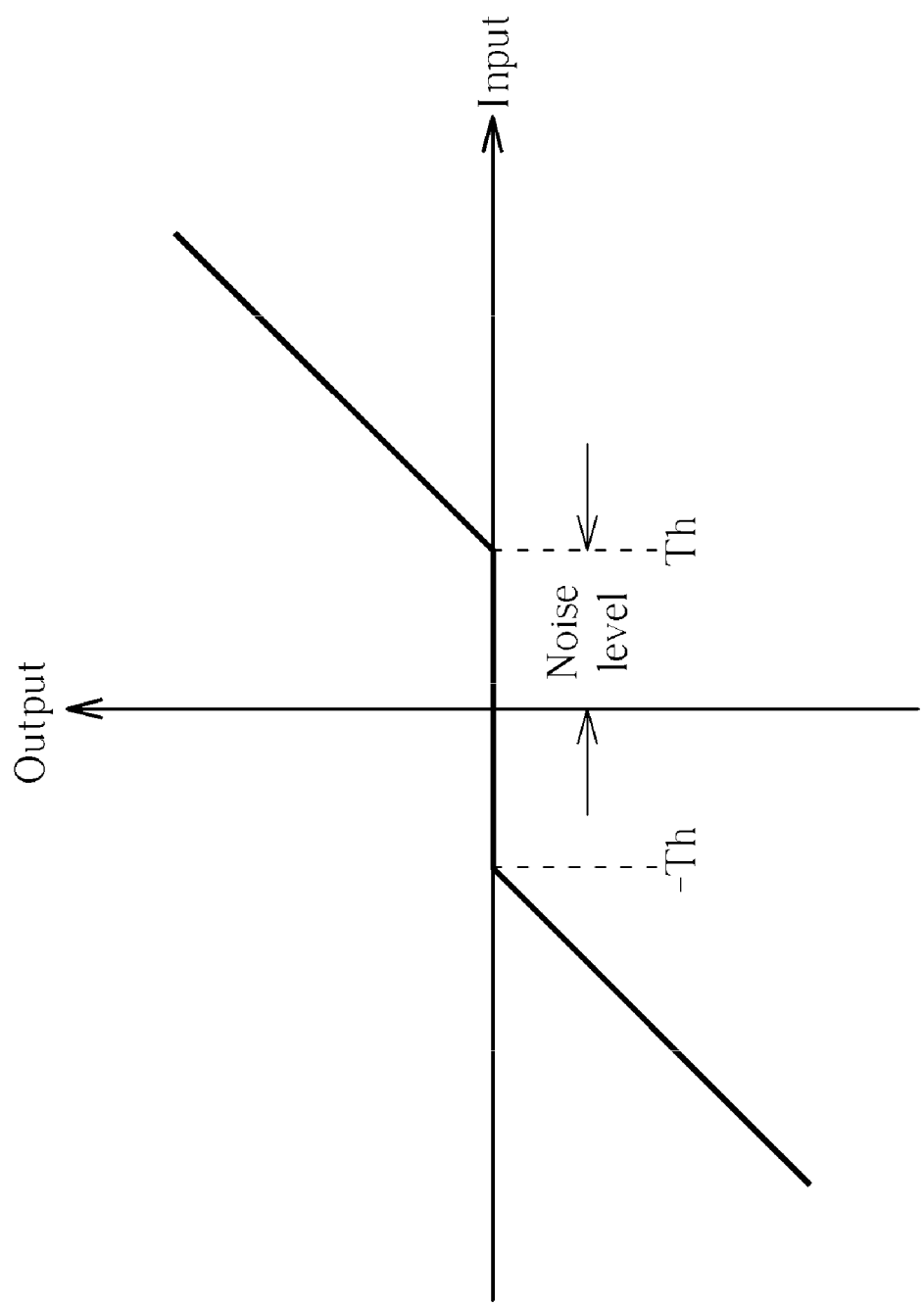
FIG. 2 illustrates a schematic diagram of input-to-output relation of a nonlinear coring operation.

In FIG. 4, the sharpness-control unit 402 can be any circuit or device for performing sharpening operations, such as the sharpness-control unit 10 shown in FIG. 1. Preferably, the sharpness compensation unit 404 adjusts the sharpened image data IN_S (m)~IN_S (n) according to the maximum value and minimum value of the original image data IN (m)~IN (n). For example, if a value of a sharpened image data IN_S (i) is greater than a maximum value MAX of the original image data IN (m)~IN (n), the value of the sharpened image data IN_S (i) can be set to be the maximum value MAX, so as to decrease the value of the sharpened image data IN_S (i). On the contrary, if a value of a sharpened image data IN_S (i) is smaller than a minimum value MIN of the original image data IN (m)~IN (n), the value of the sharpened image data IN_S (i) can be set to be the minimum value MIN, so as to magnify the value of the sharpened image data. In such case, the sharpness compensation unit 404 can be realized by the following program code (the related function operations are well known for those skilled in the art, and will not be narrated further):

```
MAX=max (IN (m), IN (m+1), . . . IN (n−1), IN (n))
MIN=min (IN (m), IN (m+1), . . . IN (n−1), IN (n))
if (IN_S (i)>MAX)
OUT=MAX;
else if (IN_S (i)<MIN)
OUT=MIN;
else
OUT=IN_S (i);
end
```

In addition, when the value of the sharpened image data IN_S (i) is greater than the maximum value MAX, the value of the sharpened image data IN_S (i) can be divided by a predefined value, in order to reduce the value of the sharpened image data IN_S (i). And when the value of the sharpened image data IN_S (i) is smaller than the minimum value MIN, the value of the sharpened image data IN_S (i) can be multiplied by a predefined value. Corresponding program code is as follows:

```
MAX=max (IN (m), IN (m+1), . . . IN (n−1), IN (n))
MIN=min (IN (m), IN (m+1), . . . IN (n−1), IN (n))
if (IN_S (i)>MAX)
OUT=IN_S (i)/A;
else if (IN_S (i)<MIN)
OUT=IN_S (i)*B;
else
OUT=IN_S (i);
end
``` where A, B represent the predefined value.

Note that, the above-mentioned program codes are exemplary embodiments of the sharpness compensation unit 404, and those skilled in the art can design circuits or program codes accordingly.

In summary, the present invention adjusts the sharpened image data according to the extremum of the original image data. Therefore, when enhancing intensity of Soft Edges, the present invention can effectively suppress overshooting of Hard Edges and avoid background noise being magnified.

Those skilled in the art will readily observe that numerous modifications and alterations of the device and method may be made while retaining the teachings of the invention.

What is claimed is:

1. An image processing method for an image processing system for enhancing image quality after a sharpening procedure comprising:
   receiving a plurality of original image data;
   performing the sharpening procedure for the plurality of original image data for generating a plurality of sharpened image data;
   decreasing a value of a first sharpened image data of the plurality of sharpened image data when the first sharpened image data is greater than a maximum value of the plurality of original image data;
   magnifying a value of a second sharpened image data of the plurality of sharpened image data when the second sharpened image data is smaller than a minimum value of the plurality of original image data; and
   outputting the plurality of sharpened image data.

2. The image processing method of claim 1, wherein performing the sharpening procedure for the plurality of original image data for generating the plurality of sharpened image data comprises:
   performing high-pass filtering operations for the plurality of original image data for generating a plurality of high-pass filtering results;
   performing coring operations for the plurality of high-pass filtering results for generating a plurality of coring results;
   multiplying the plurality of coring results by a gain for generating a plurality of edge-enhanced data; and
   accumulating the plurality of edge-enhanced data and the plurality of original image data for generating the plurality of sharpened image data.

3. The image processing method of claim 1, wherein decreasing the value of the sharpened image data is setting the value of the sharpened image data as the maximum value of the plurality of original image data.

4. The image processing method of claim 1, wherein decreasing the value of the sharpened image data is dividing the value of the sharpened image data by a predefined value.

5. The image processing method of claim 1, wherein magnifying the value of the sharpened image data is setting the value of the sharpened image data as the minimum value of the plurality of original image data.

6. The image processing method of claim 1, wherein magnifying the value of the sharpened image data is multiplying the value of the sharpened image data by a value set beforehand.

7. An image processing apparatus for an image processing system, for enhancing image quality after a sharpening procedure, comprising:
   a reception end for receiving a plurality of original image data;
   a sharpness control unit coupled to the reception end, for performing the sharpening procedure for the plurality of original image data for generating a plurality of sharpened image data;
   a sharpness compensation unit coupled to the reception end and the sharpness control unit, for adjusting the plurality of sharpened image data according to the plurality of original image data, comprising:
      an extremum determination unit coupled to the reception end, for determining maximum and minimum values of the plurality of original image data; and
      a first limiter, coupled to the extremum determination unit and the sharpness control unit, for decreasing a value of a first sharpened image data of the plurality of sharpened image data when the first sharpened image data is greater than the maximum value of the plurality of original image data; and
      a second limiter, coupled to the extremum determination unit and the sharpness control unit, for magnifying a value of a second sharpened image data of the plurality of sharpened image data when the second sharpened image data is smaller than the minimum value of the plurality of original image data; and
   an output end coupled to the sharpness compensation unit, for outputting the plurality of sharpened image data.

8. The image processing apparatus of claim 7, wherein the sharpness control unit comprises:
   a high-pass filter coupled to the reception end, for performing high-pass filtering operations for the plurality of original image data for generating a plurality of high-pass filtering results;
   a coring operation unit coupled to the high-pass filter, for performing coring operations for the plurality of high-pass filtering results for generating a plurality of coring results;
   a multiplier coupled to the coring operation unit, for multiplying the plurality of coring results by a gain for generating a plurality of edge-enhanced data; and
   an adder coupled to the multiplier and the reception end, for accumulating the plurality of edge-enhanced data and the plurality of original image data for generating the plurality of sharpened image data.

9. The image processing apparatus of claim 7, wherein the limiter sets the value of the sharpened image data as the maximum value of the plurality of original image data for decreasing the value of the sharpened image data.

10. The image processing apparatus of claim 7, wherein the limiter dividing the sharpened image data by a predefined value for decreasing the value of the sharpened image data.

11. The image processing apparatus of claim 7, wherein the limiter sets the value of the sharpened image data as the minimum value of the plurality of original image data for magnifying the value of the sharpened image data.

12. The image processing apparatus of claim 7, wherein the limiter multiplies the value of the sharpened image data by a predefined value for magnifying the value of the sharpened image data.

* * * * *